(12) United States Patent
Ge (10) Patent No.: US 9,167,875 B2
(45) Date of Patent: Oct. 27, 2015

(54) PROTECTION CASE FOR ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Hai-Qian Ge, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 5 days.

(21) Appl. No.: 14/140,644

(22) Filed: Dec. 26, 2013

(65) Prior Publication Data

US 2014/0185204 A1    Jul. 3, 2014

(30) Foreign Application Priority Data

Dec. 27, 2012    (CN) .......................... 2012 1 0578116

(51) Int. Cl.
*G06F 1/16*    (2006.01)
*A45C 11/00*    (2006.01)

(52) U.S. Cl.
CPC ............ *A45C 11/00* (2013.01); *A45C 2011/003* (2013.01); *A45F 2200/0525* (2013.01); *G06F 2200/1633* (2013.01)

(58) Field of Classification Search
CPC .................................. G06F 1/16; G06F 1/1601
USPC .............. 361/679.01, 679.21, 679.26, 679.3; 260/320, 701
See application file for complete search history.

(56) References Cited

U.S. PATENT DOCUMENTS

| | | | |
|---|---|---|---|
| 6,532,152 B1 * | 3/2003 | White et al. .................. | 361/692 |
| 6,646,864 B2 * | 11/2003 | Richardson ................ | 361/679.3 |
| 7,277,240 B2 * | 10/2007 | Carnevali ...................... | 359/802 |
| 8,014,142 B2 * | 9/2011 | Prest et al. .................. | 361/679.3 |
| 8,531,834 B2 * | 9/2013 | Rayner ..................... | 361/679.56 |
| 2005/0247584 A1 * | 11/2005 | Lu ................................. | 206/320 |

* cited by examiner

*Primary Examiner* — Anthony Haughton
(74) *Attorney, Agent, or Firm* — Novak Druce Connolly Bove + Quigg LLP (57) ABSTRACT

A protecting case for protecting an electronic device from external impact includes a hollow main body filled with water and a number of buffering modules received in the main body. The electronic device is received in the main body. The buffering modules are deformed to release active metal powder into the water when the main body falls to the ground. The active metal powder is a chemical that reacts with water to generate hydrogen gas.

15 Claims, 8 Drawing Sheets

PROTECTION CASE FOR ELECTRONIC DEVICE

TECHNICAL FIELD

The disclosure generally relates to cases, and particularly to a protection case for an electronic device.

DESCRIPTION OF RELATED ART

Protection cases for electronic devices may be made of plastic, which cannot provide good protection if the electronic device is impacted by an external force.

Therefore, it is desirable to provide a means to overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
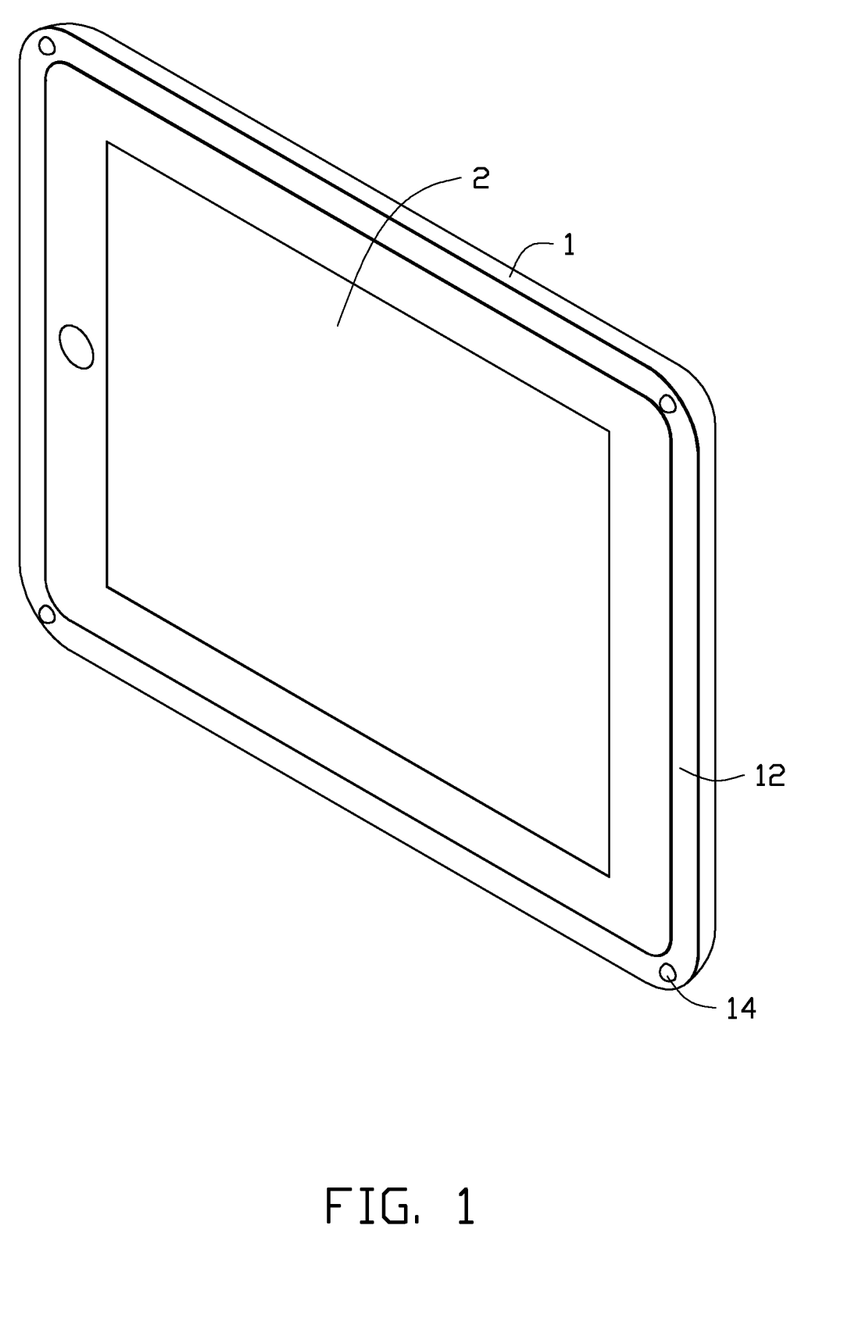
FIG. 1 is an isometric, assembled view of an embodiment of a protection case of an electronic device.
Figure 2:
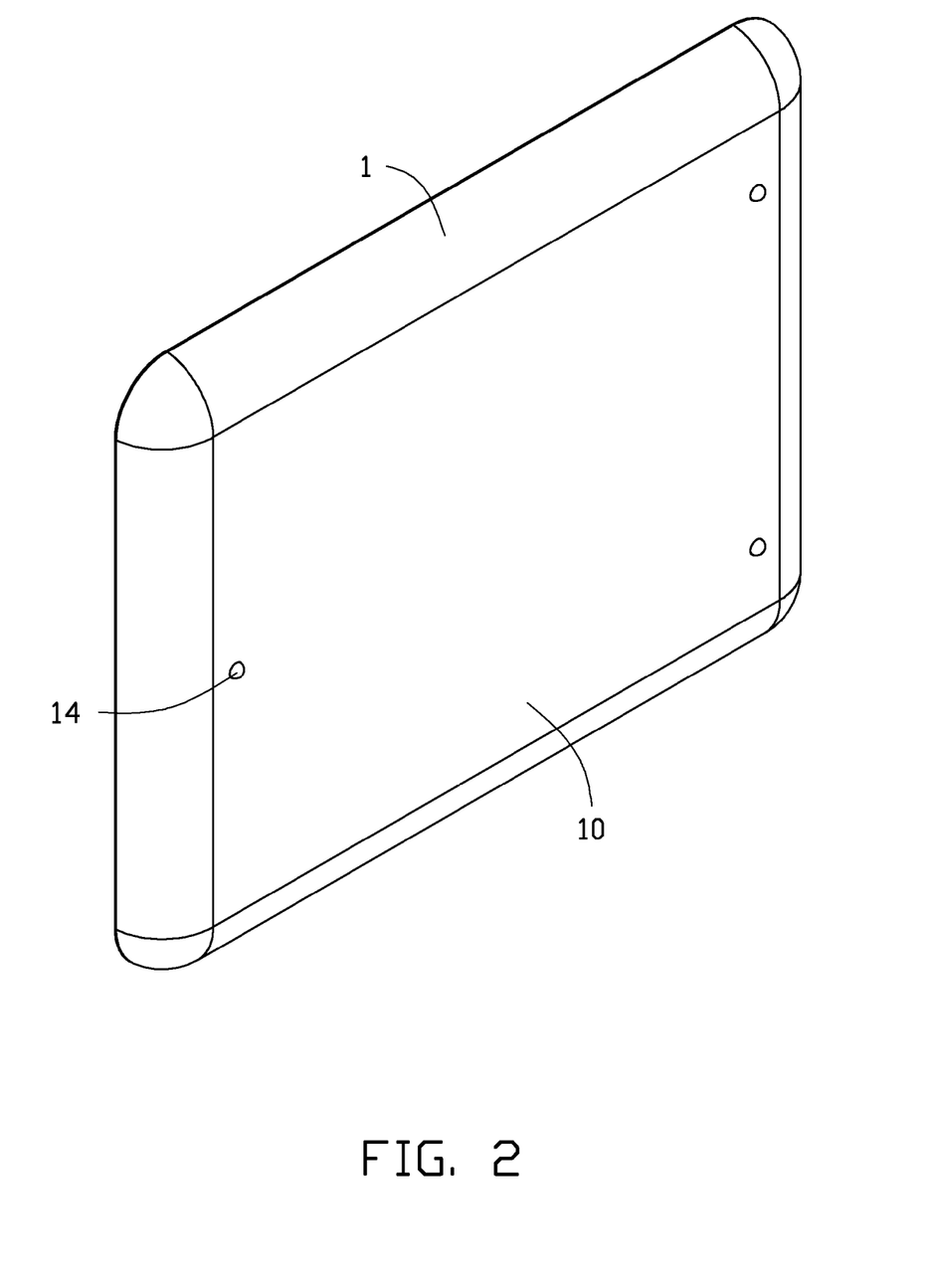
FIG. 2 is an isometric, assembled view of the protection case of FIG. 1, viewed from another angle.
Figure 3:
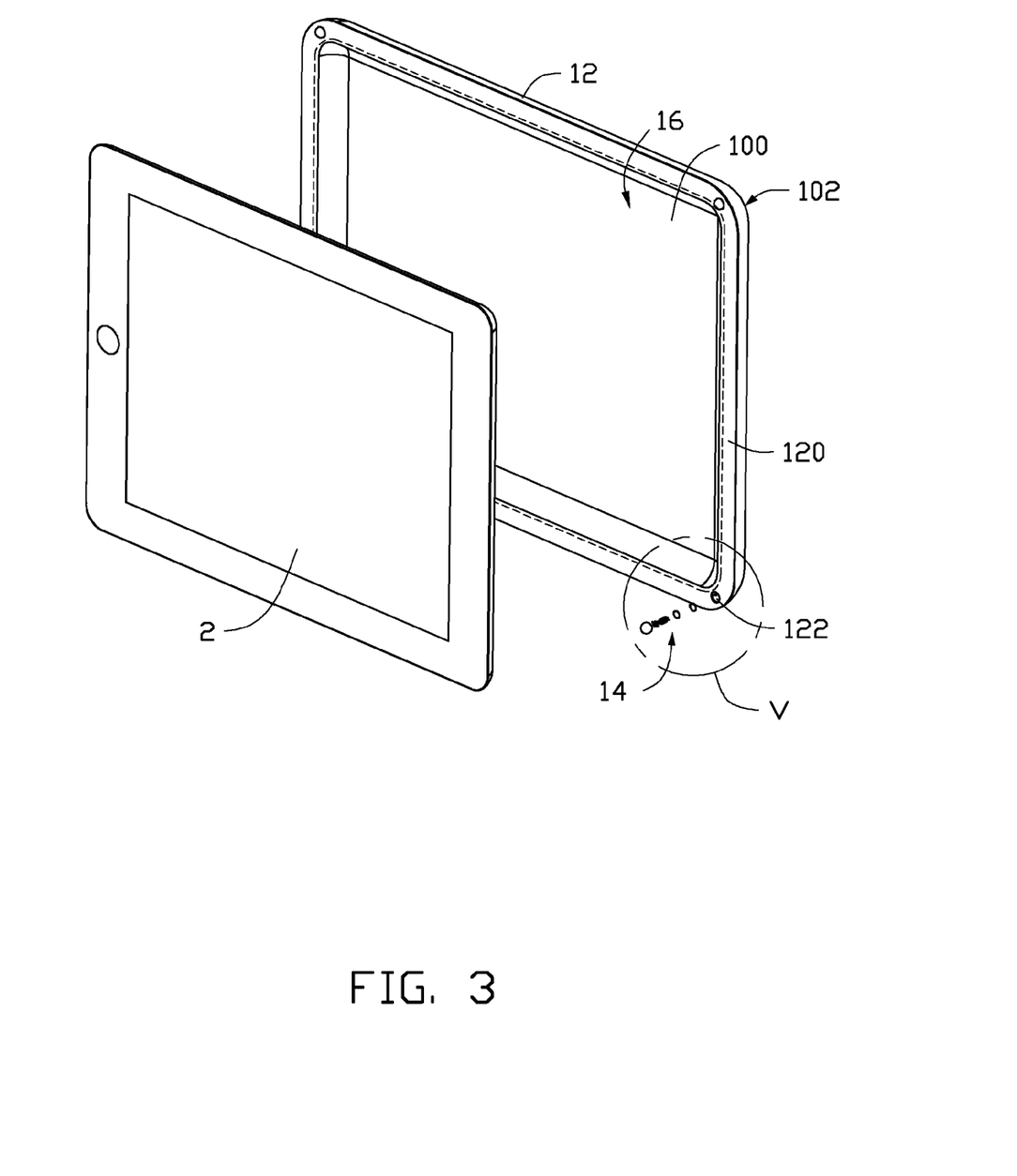
FIG. 3 is an isometric, exploded view of the protection case of FIG. 1.

FIGS. 1, 2, and 3 show a protection case 1 for an electronic device 2 that includes a baseboard 10, a sidewall 12, and a number of buffering modules 14. The sidewall 12 extends from a periphery of the baseboard 10. The buffering modules 14 are received in the sidewall 12 and the baseboard 10. The baseboard 10 and the sidewall 12 cooperatively define a receiving space 16 to receive the electronic device 2. In one embodiment, the baseboard 10 and the sidewall 12 are substantially hollow and filled with a liquid, such as water. The buffering modules 14 release active metal powder 142 into the water when the protection case 1 is impacted by an external force. The active metal powder 142 is a chemical that reacts with water to generate hydrogen gas. Thus, the external force impacting the protection case 1 is buffered via a buoyancy generated by a difference in density between the hydrogen gas and air. In the illustrated embodiment, the electronic device 2 is a tablet computer. The active metal powder 142 can be, but is not limited to, sodium, magnesium, or potassium.

Figure 4:
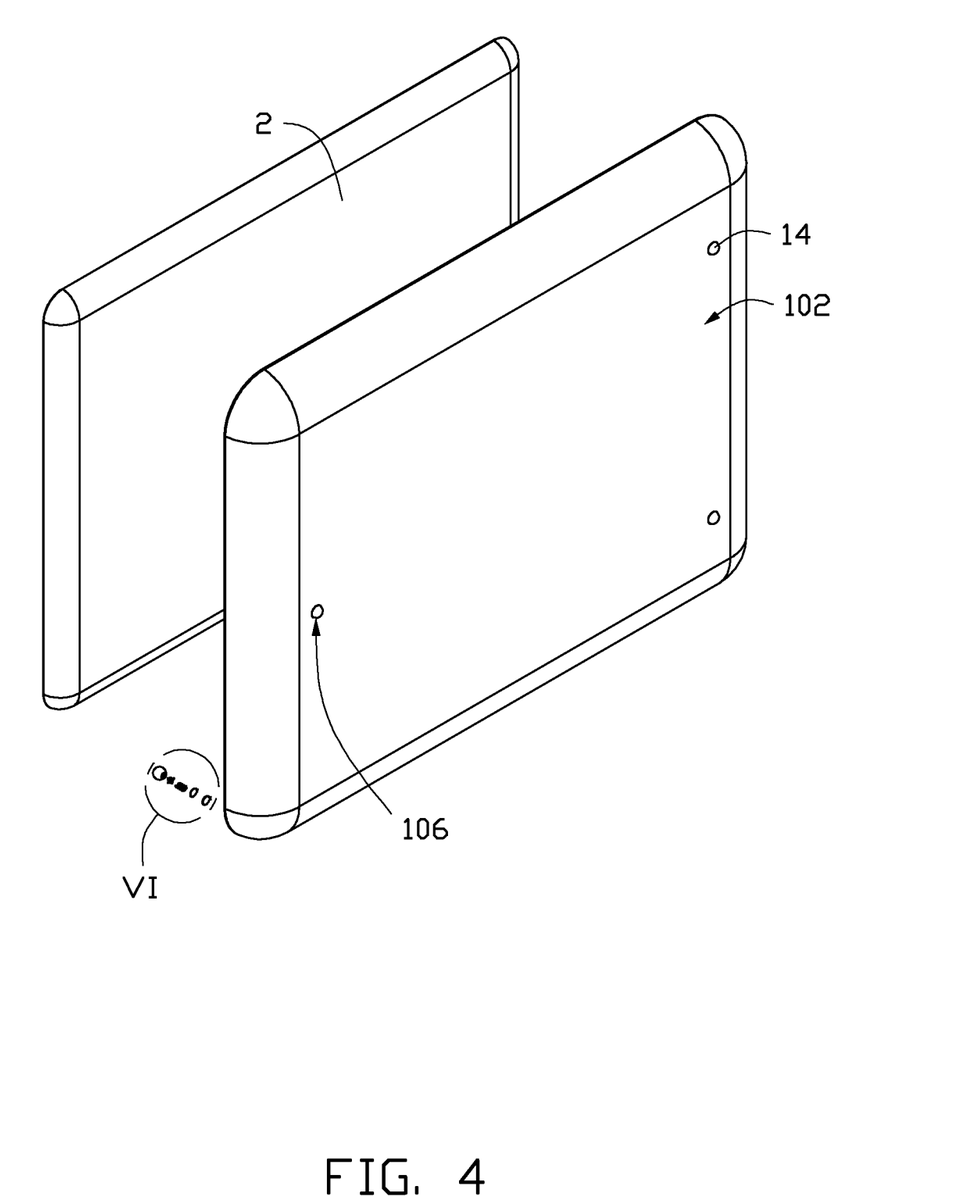
FIG. 4 is an isometric, exploded view of the protection case of FIG. 1, viewed from another angle.

FIGS. 3 and 4 show that the baseboard 10 has a predetermined thickness and includes an inner side surface 100 and an outer side surface 102 substantially parallel to the inner side surface 100. The receiving space 16 is defined in the inner side surface 100. The inner side surface 100 contacts the electronic device 2 when the electronic device 2 is received in the protection case 1. The protection case 1 defines a number of first receiving holes 106 in the outer side surface 102 to receive the buffering modules 14.

Figure 7:
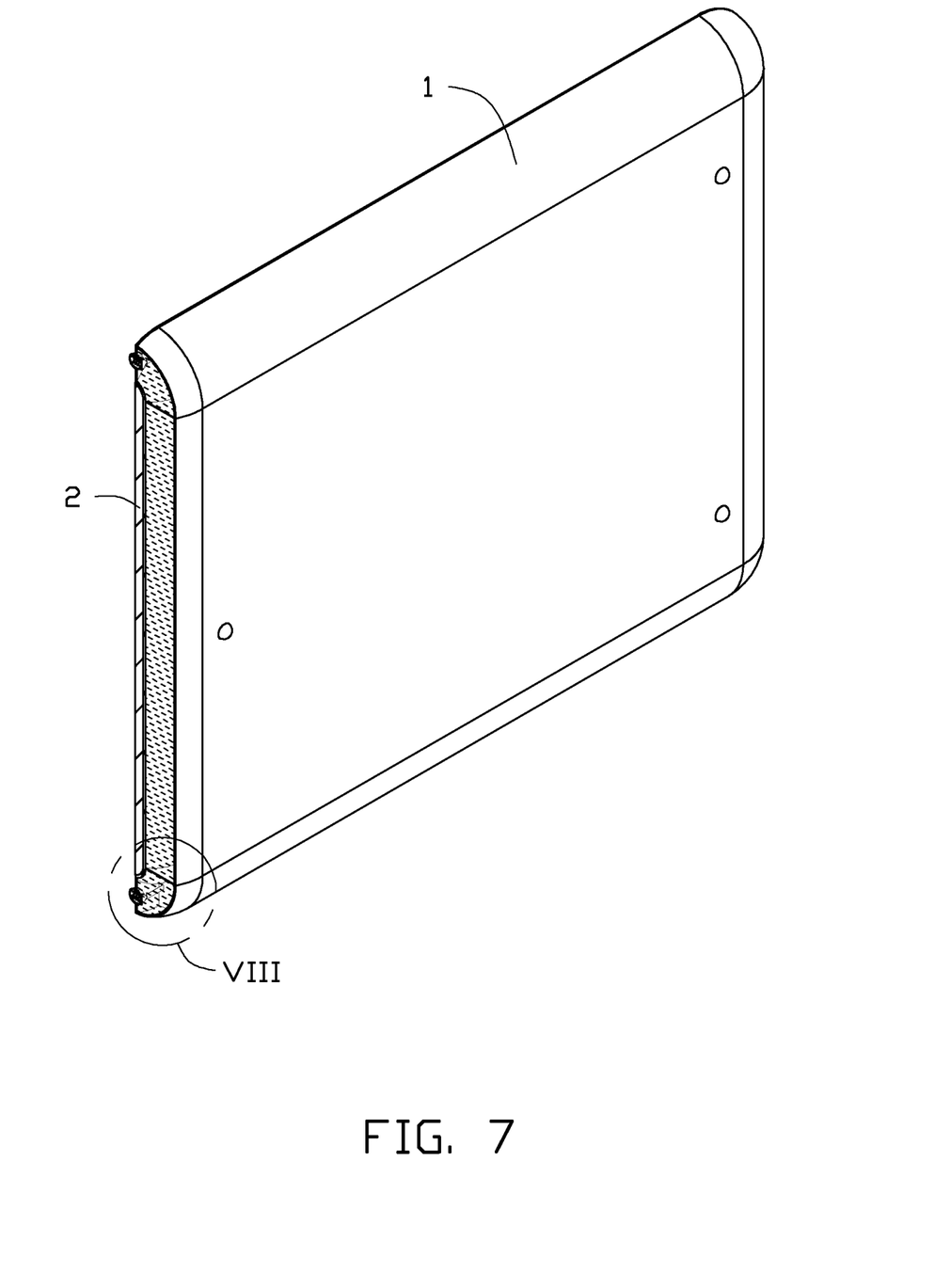
FIG. 7 is a cutaway view of the protection case and the electronic device of FIG. 2.

The sidewall 12 extends from the periphery of the baseboard 10. FIG. 7 shows that a hollow space in the sidewall 12 communicates with a hollow space in the baseboard 10. The sidewall 12 includes a top surface 120 substantially parallel to the outer side surface 102 of the baseboard 10. The sidewall 12 defines a number of second receiving holes 122 in the top surface 120 to receive the buffering modules 14.

In the illustrated embodiment, the baseboard 10 is substantially rectangular. There are three first receiving holes 106, four second receiving holes 122, and seven buffering modules 14. The second receiving holes 122 are defined in corresponding four corners of the protection case 1.

Figure 5:
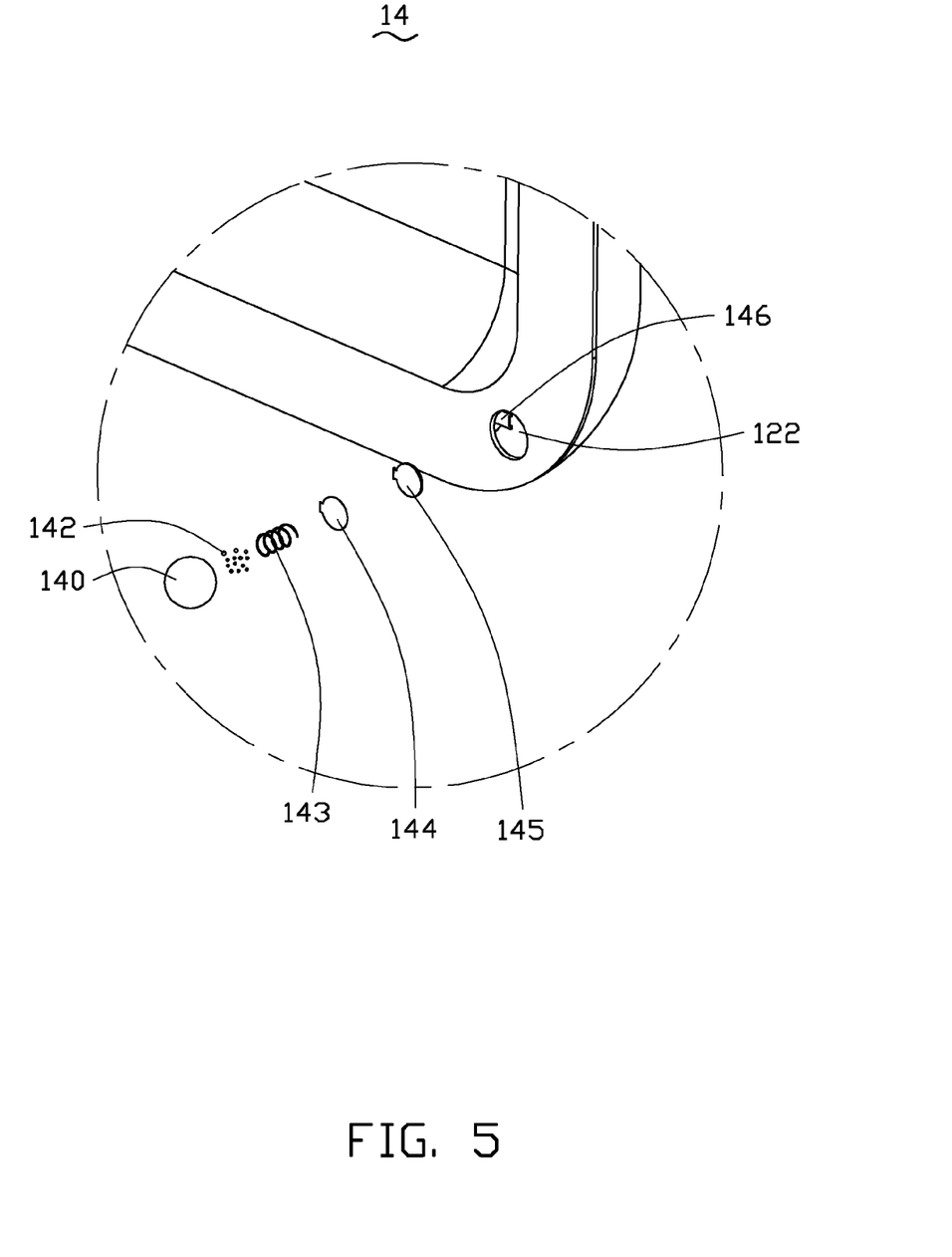
FIG. 5 is an enlarged view of a circled portion V of FIG. 3.
Figure 6:
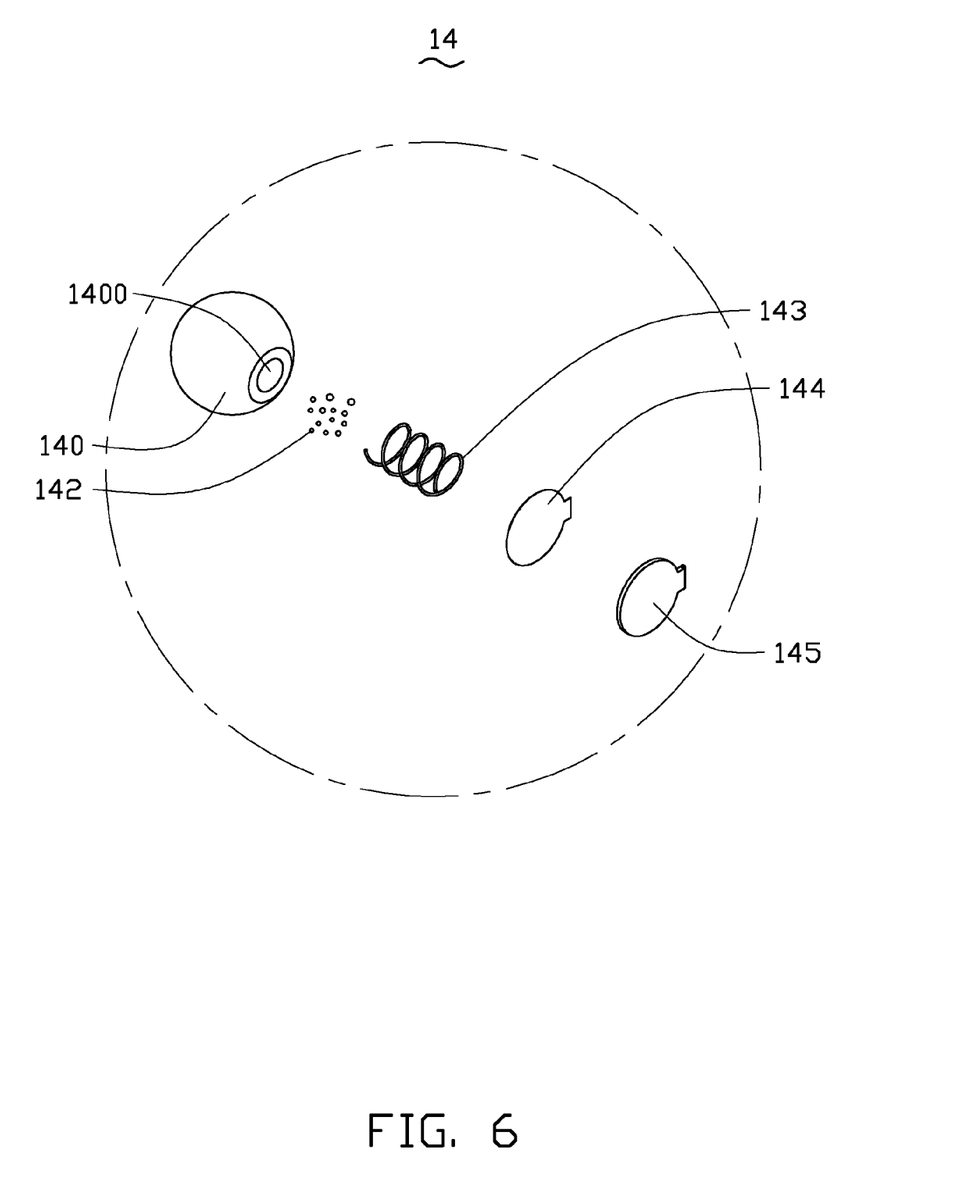
FIG. 6 is an enlarged view of a circled portion VI of FIG. 4.

FIGS. 5 and 6 show that each of the buffering modules 14 includes a receiving body 140, the active metal powder 142, a spring 143, a first plate 144, a second plate 145, and a holding arm 146. The receiving body 140 is substantially hollow and made of resilient material. The receiving body 140 defines an opening 1400. In the illustrated embodiment, the receiving body 140 is a hollow ball. The active metal powder 142 and the spring 143 are received in the receiving body 140. A first end of the spring 143 is connected to an inner surface of the receiving body 140. A second end of the spring 143 is connected to the first plate 144. The first plate 144 and the second plate 145 are made of magnetic material. The first plate 144 includes a first surface (not labeled) facing the second plate 145. The second plate 145 includes a second surface (not labeled) facing the first plate 144. Magnetic polarity of the first surface is opposite to magnetic polarity of the second surface. Thus, the first plate 144 attracts the second plate 145 via a magnetic force. The holding arm 146 includes a fixing end 1460 connected to an inner side of the sidewall 12, and a free end 1462 connected to the second plate 145.

Figure 8:
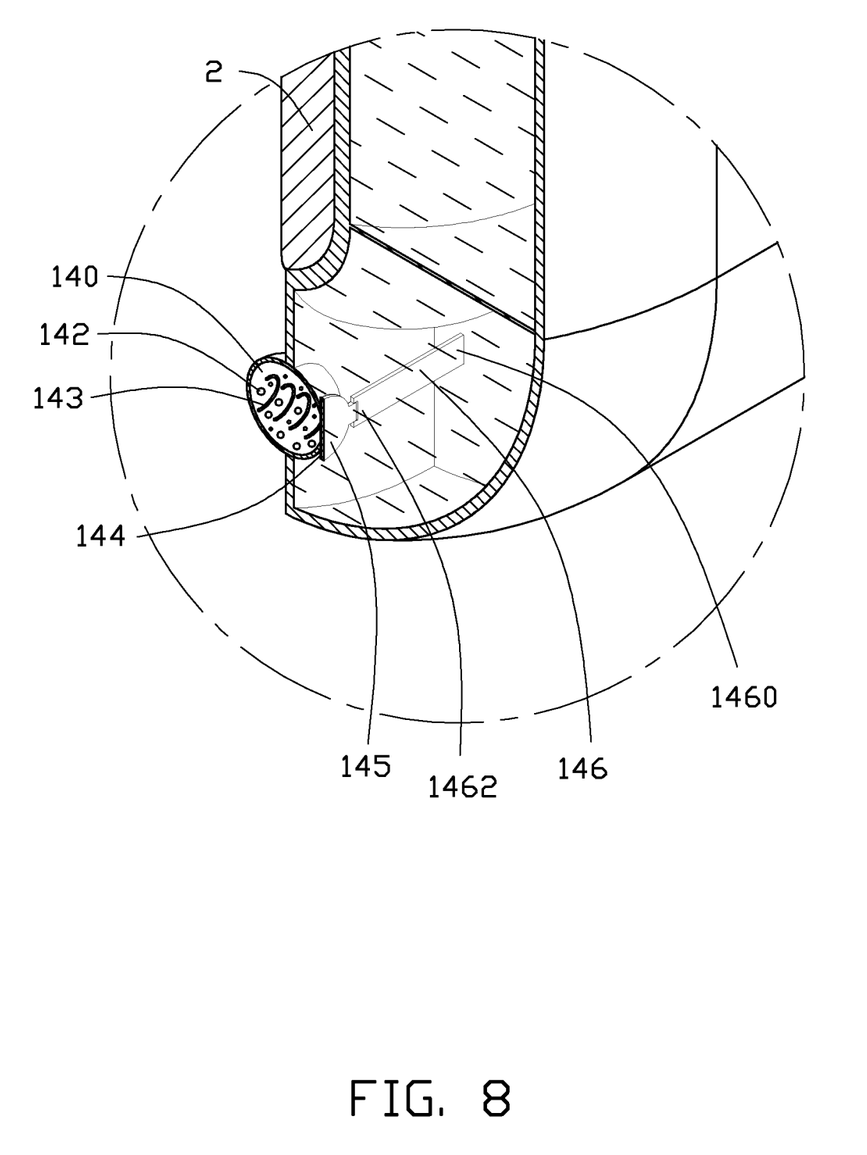
FIG. 8 is an enlarged view of a circled portion VIII of FIG. 7.

FIGS. 7 and 8 show that in assembly, the sidewall 12 and the baseboard 10 are filled with water. The active metal powder 142 is filled in the receiving body 140 via the opening 1400. The first plate 144 is pulled by the spring 143 to block the opening 1400. The receiving bodies 140 are received in a respective first receiving hole 106 or a respective second receiving hole 122. A part of the receiving body 140 protrudes out of the first receiving hole 106 or the second receiving hole 122. The other part of the receiving body 140 is accommodated inside the sidewall 12 or the baseboard 10. The free end 1462 of the holding arm 146 holds the second plate 145. The second plate 145 is attracted to the first plate 144 by the magnetic force.

When the protection case 1 is impacted by an external force, the receiving body 140 is deformed by the external force, which causes the spring 143 to be stretched to push the first plate 144 away from the opening 1400. Thus, the active metal powder 142 is released into the water to generate hydrogen gas, and the external force is buffered by the buoyancy generated by a difference in density between the hydrogen gas and the air.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A protection case for an electronic device, comprising:
a hollow baseboard;
a hollow sidewall extending from a periphery of the baseboard towards a same direction and defining a receiving space in cooperation with the baseboard to receive the electronic device; and
at least one buffering module received in the baseboard and the sidewall;
wherein the hollow baseboard and the sidewall are filled with water, and the at least one buffering module releases active metal powder into the water when the protection case is impacted by an external force.

2. The protection case of claim 1, wherein the baseboard comprises an inner side surface and an outer side surface parallel opposite to the inner side surface, the receiving space is defined by the inner side surface, and the protection case defines a plurality of first receiving holes in the outer side surface to receive the at least one buffering modules.

3. The protection case of claim 2, wherein the sidewall comprises a top surface parallel to the outer side surface of the baseboard, and the sidewall defines a plurality of second receiving holes in the top surface to receive the at least one buffering modules.

4. The protection case of claim 3, wherein the baseboard is rectangular, and the second receiving holes are defined corresponding to four corners of the protection case.

5. The protection case of claim 3, wherein each buffering module comprises a hollow receiving body stuck in the first receiving holes or the second receiving holes, a spring received in the receiving body, and a first plate, the receiving body defines an opening at a bottom of the receiving body, the active metal powder is filled in the receiving body via the opening, and the first plate is pulled to block the opening via a restoring force provided by the spring.

6. The protection case of claim 5, wherein the at least one buffering module further comprises a second plate and a holding arm, the holding arm comprises a fixing end connected to an inner side of the sidewall and a free end connected to the second plate, the first plate and the second plate are made of magnetic material, and the second plate is attracted to the first plate via a magnetic force.

7. The protection case of claim 1, wherein the active metal powder is selected from the group consisting of sodium, magnesium, and potassium.

8. A case for an electronic device, comprising:
a hollow main body covering at least a portion of the electronic device; and
a plurality of buffering modules received in the main body;
wherein the main body is filled with water, each buffering module is deformed to release active metal powder into the water when the main body is impacted by an external force, the active metal powder chemically reacts with the water to generate hydrogen gas, and the external force applied to the main body by the ground is buffered via a buoyancy generated by a difference in density between the hydrogen gas and the air.

9. The case of claim 8, wherein the main body comprises a hollow baseboard and a hollow sidewall extending from a periphery of the baseboard towards a same direction, and the electronic device is accommodated in a receiving space defined by the baseboard in cooperation with the sidewall.

10. The case of claim 9, wherein the baseboard includes an inner side surface and an outer side surface parallel opposite to the inner side surface, the receiving space is defined by the inner side surface, and the case defines a plurality of first receiving holes in the outer side surface to receive the buffering modules.

11. The case of claim 10, wherein the sidewall comprises a top surface parallel to the outer side surface of the baseboard, and the sidewall defines a plurality of second receiving holes in the top surface to receive the buffering modules.

12. The case of claim 11, wherein the baseboard is rectangular, and the second receiving holes are defined corresponding to four corners of the case.

13. The case of claim 11, wherein each buffering module comprises a hollow receiving body stuck in the first receiving holes or the second receiving holes, a spring received in the receiving body, and a first plate, the receiving body defines an opening at a bottom of the receiving body, the active metal powder is filled in the receiving body via the opening, and the first plate is pulled to block the opening via a restoring force provided by the spring.

14. The case of claim 13, wherein the buffering modules further comprise a second plate and a holding arm, the holding arm comprises a fixing end connected to an inner side of the sidewall and a free end connected to the second plate, the first plate and the second plate are made of magnetic material, and the second plate is attracted to the first plate via a magnetic force.

15. The case of claim 8, wherein the active metal powder is selected from the group consisting of sodium, magnesium, and potassium.

* * * * *